(12) United States Patent
Yu et al.

(10) Patent No.: US 8,970,550 B2
(45) Date of Patent: Mar. 3, 2015

(54) TOUCH PANEL AND TOUCH DISPLAY

(71) Applicant: Hannstar Display Corporation, New Taipei (TW)

(72) Inventors: Chia-Hua Yu, New Taipei (TW); Yu-Cheng Lin, Pingtung County (TW); Ping-Yuan Su, Kaohsiung (TW); Kun-Hua Tsai, Tainan (TW); Hsing-Ying Lee, Tainan (TW)

(73) Assignee: HannStar Display Corporation, Taipei (TW)

( * ) Notice: Subject to any disclaimer, the term of this patent is extended or adjusted under 35 U.S.C. 154(b) by 32 days.

(21) Appl. No.: 13/964,122

(22) Filed: Aug. 12, 2013

(65) Prior Publication Data

US 2014/0333847 A1    Nov. 13, 2014

(30) Foreign Application Priority Data

May 9, 2013    (CN) .......................... 2013 1 0169592

(51) Int. Cl.
| | | |
|---|---|---|
| G06F 3/045 | (2006.01) | |
| G06F 3/041 | (2006.01) | |
| G06F 1/16 | (2006.01) | |
| G06F 3/044 | (2006.01) | |

(52) U.S. Cl.
CPC .............. G06F 1/1692 (2013.01); G06F 3/044 (2013.01); *G02F 2201/38* (2013.01)
USPC .......................................... 345/174; 345/173

(58) Field of Classification Search
CPC .............................. G02F 2201/38; G06F 3/044
USPC ............................................ 178/18.01–20.04
See application file for complete search history.

(56) References Cited

U.S. PATENT DOCUMENTS

| | | | | |
|---|---|---|---|---|
| 5,556,694 | A * | 9/1996 | Austin | 428/212 |
| 8,134,527 | B2 * | 3/2012 | Chien et al. | 345/88 |
| 2009/0015761 | A1 * | 1/2009 | Stockham | 349/96 |
| 2009/0051668 | A1 * | 2/2009 | Cheng | 345/173 |
| 2009/0244028 | A1 * | 10/2009 | Matsuo | 345/174 |
| 2009/0273581 | A1 * | 11/2009 | Kim et al. | 345/175 |
| 2009/0322702 | A1 * | 12/2009 | Chien et al. | 345/174 |
| 2009/0322705 | A1 * | 12/2009 | Halsey, IV | 345/174 |
| 2011/0128252 | A1 * | 6/2011 | Nah | 345/174 |
| 2013/0215050 | A1 * | 8/2013 | Lai | 345/173 |
| 2014/0225862 | A1 * | 8/2014 | Murata et al. | 345/174 |

* cited by examiner

*Primary Examiner* — Patrick F Marinelli
(74) *Attorney, Agent, or Firm* — Jianq Chyun IP Office (57) ABSTRACT

A touch panel that includes a first substrate, a touch sensing layer, a compensation pattern layer, a second substrate, and a first optical adhesive layer is provided. The touch sensing layer includes a plurality of electrode sets arranged in parallel, and each of the electrode sets includes a scan electrode and a plurality of sensing electrodes. An orthogonal projection of the touch sensing layer on the first substrate is not overlapped with an orthogonal projection of the compensation pattern layer on the first substrate. The compensation pattern layer and the touch sensing layer are located between the first substrate and the second substrate. The first optical adhesive layer is located between the first substrate and the second substrate. A touch display is also provided.

4 Claims, 6 Drawing Sheets

TOUCH PANEL AND TOUCH DISPLAY

CROSS-REFERENCE TO RELATED APPLICATION

This application claims the priority benefit of China application serial no. 201310169592.5, filed on May 9, 2013. The entirety of the above-mentioned patent application is hereby incorporated by reference herein and made a part of this specification.

BACKGROUND OF THE INVENTION

1. Field of the Invention

The invention relates to a touch panel and a touch display; more particularly, the invention relates to a touch panel and a touch display which are characterized by great visibility.

2. Description of Related Art

As information technology, wireless mobile communication, and information appliances have been rapidly developed and applied in recent years, various information products have utilized touch panels as input devices in replacement of conventional input devices (e.g., keyboards or mice), so as to ensure the convenience, the compactness, and the user-friendly design of the information products.

Figure 1:
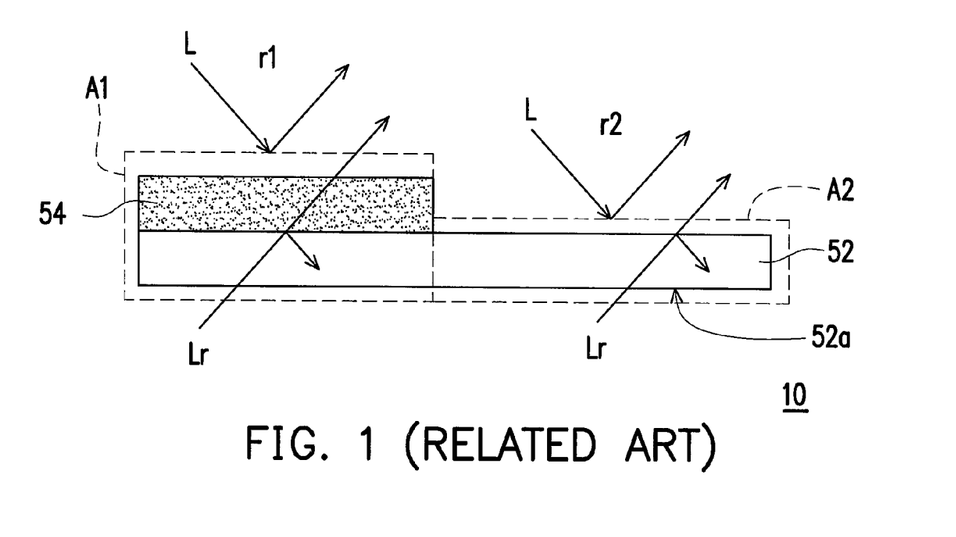
FIG. 1 is a schematic partial cross-sectional view of a conventional touch panel.

FIG. 1 is a schematic partial cross-sectional view of a conventional touch panel. With reference to FIG. 1, a touch sensing layer 54 of a touch panel 10 is located on a substrate 52, and thus the substrate 52 may be divided into two regions A1 and A2. The region A1 has the touch sensing layer 54, while the region A2 does not have the touch sensing layer 54. The structure of the stacked film layers in the region A1 is different from that in the region A2. Hence, the reflectivity r1 and the reflectivity r2 of light L in the respective regions A1 and A2 are also different, which leads to different visual effects. Thereby, the resultant visibility of the touch panel 10 is not satisfactory and causes inconvenience to users. Besides, the reflected light Lr entering the regions A1 and A2 from a bottom surface 52a of the substrate 52 may optically interfere with the light L due to the difference of the reflectivity r1 and the reflectivity r2 in these two regions A1 and A2.

As a result, there is still room for improvement of the optical properties of the conventional touch panel.

In view of the above, the conventional touch panel is structurally and practically defective and inconvenient, thus requiring further amelioration. Therefore, how to create a touch panel and a touch display with an improved quality has become an essential topic in the pertinent field.

SUMMARY OF THE INVENTION

The invention is directed to a touch panel and a touch display with a novel structure to reduce the defects existing in the conventional touch panel. Specifically, a compensation pattern layer is configured in the touch panel for enhancing the visibility of the touch panel, and thereby the touch panel described herein can be extensively applied.

In another aspect, a compensation pattern layer is configured in the touch display for enhancing the visibility of the touch display, and thereby the touch display described herein can be extensively applied.

In an embodiment of the invention, a touch panel that includes a first substrate, a touch sensing layer, a compensation pattern layer, a second substrate, and a first optical adhesive layer is provided. The touch sensing layer includes a plurality of electrode sets arranged in parallel, and each of the electrode sets includes a scan electrode and a plurality of sensing electrodes. An orthogonal projection of the touch sensing layer on the first substrate is not overlapped with an orthogonal projection of the compensation pattern layer on the first substrate. The compensation pattern layer and the touch sensing layer are located between the first substrate and the second substrate. Besides, the first optical adhesive layer is located between the first substrate and the second substrate as well.

According to an embodiment of the invention, in the touch panel, a region where the touch sensing layer is located has a reflectivity R1, a region where the compensation pattern layer is located has a reflectivity R2, and a difference between R1 and R2 is less than 1%.

According to an embodiment of the invention, in the touch panel, the compensation pattern layer and the touch sensing layer are both located on the second substrate.

According to an embodiment of the invention, in the touch panel, the first optical adhesive layer is located between the touch sensing layer and the compensation pattern layer.

According to an embodiment of the invention, in the touch panel, the touch sensing layer further includes a plurality of connection lines and a plurality of connection pads. Parts of the connection lines are connected between the scan electrodes and parts of the connection pads, and the other parts of the connection lines are connected between the sensing electrodes and the other parts of the connection pads.

In another embodiment of the invention, a touch display that includes a display panel, a first substrate located above the display panel, a touch sensing layer, a compensation pattern layer, and a first optical adhesive layer is provided. The touch sensing layer includes a plurality of electrode sets arranged in parallel, and each of the electrode sets includes a scan electrode and a plurality of sensing electrodes. An orthogonal projection of the touch sensing layer on the first substrate is not overlapped with an orthogonal projection of the compensation pattern layer on the first substrate. The compensation pattern layer and the touch sensing layer are located between the first substrate and the display panel. Besides, the first optical adhesive layer is located between the first substrate and the display panel as well.

According to an embodiment of the invention, in the touch display, a region where the touch sensing layer is located has a reflectivity R1, a region where the compensation pattern layer is located has a reflectivity R2, and an absolute value of a difference between R1 and R2 is less than 1%.

According to an embodiment of the invention, in the touch display, the compensation pattern layer and the touch sensing layer are located between the display panel and the first optical adhesive layer.

According to an embodiment of the invention, in the touch display, the compensation pattern layer and the touch sensing layer are located at two respective sides of the first optical adhesive layer.

According to an embodiment of the invention, in the touch display, the touch sensing layer further includes a plurality of connection lines and a plurality of connection pads, parts of the connection lines are connected between the scan electrodes and parts of the connection pads, and the other parts of the connection lines are connected between the sensing electrodes and the other parts of the connection pads.

In light of the foregoing, the touch panel described herein includes the first substrate, the touch sensing layer, the compensation pattern layer, the second substrate, and the first optical adhesive layer. The touch sensing layer includes the electrode sets arranged in parallel, and each of the electrode sets includes the scan electrode and the sensing electrodes. The orthogonal projection of the touch sensing layer on the first substrate is not overlapped with the orthogonal projection of the compensation pattern layer on the first substrate. The compensation pattern layer and the touch sensing layer are located between the first substrate and the second substrate. The first optical adhesive layer is located between the first substrate and the second substrate. On the other hand, the touch display described herein includes the display panel, the first substrate, the touch sensing layer, and the first optical adhesive layer. The first substrate is located above the display panel. The touch sensing layer includes the electrode sets arranged in parallel, and each of the electrode sets includes the scan electrode and the sensing electrodes. The orthogonal projection of the touch sensing layer on the first substrate is not overlapped with the orthogonal projection of the compensation pattern layer on the first substrate, and the touch sensing layer and the compensation pattern layer are both located between the first substrate and the display panel. The first optical adhesive layer is located between the first substrate and the display panel. The region where the touch sensing layer is located has a reflectivity R1, the region where the compensation pattern layer is located has a reflectivity R2, and the difference between R1 and R2 is less than 1%. The compensation pattern layer and the touch sensing layer are both located on the second substrate. The first optical adhesive layer is located between the touch sensing layer and the compensation pattern layer. The touch sensing layer further includes the connection lines and the connection pads. Parts of the connection lines are connected between the scan electrode and parts of the connection pads, and the other parts of the connection lines are connected between the sensing electrodes and the other parts of the connection pads. The compensation pattern layer and the touch sensing layer are located between the first substrate and the display panel. The compensation pattern layer and the touch sensing layer are located at two respective sides of the first optical adhesive layer.

As provided above, the touch panel and the touch display described herein are characterized by the compensation pattern layer, and thus the touch panel and the touch display may individually be divided into two regions. The touch sensing layer is located at one of these two regions, and the compensation pattern layer is located at the other region. Since the orthogonal projection of the touch sensing layer on the first substrate is not overlapped with the orthogonal projection of the compensation pattern layer on the first substrate, the region where the compensation pattern layer is located is beyond the region where the touch sensing layer is located. Conventionally, when light passes through different regions of the touch panel or the touch display, the reflectivities of light may be different in respective regions because of different structures of the stacked film layers in these regions, and the difference in reflectivities of light often leads to poor visibility. However, in an embodiment of the invention, the issue of poor visibility can be resolved.

Several exemplary embodiments accompanied with figures are described in detail below to further describe the invention in details.

DETAILED DESCRIPTION OF DISCLOSED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 2:
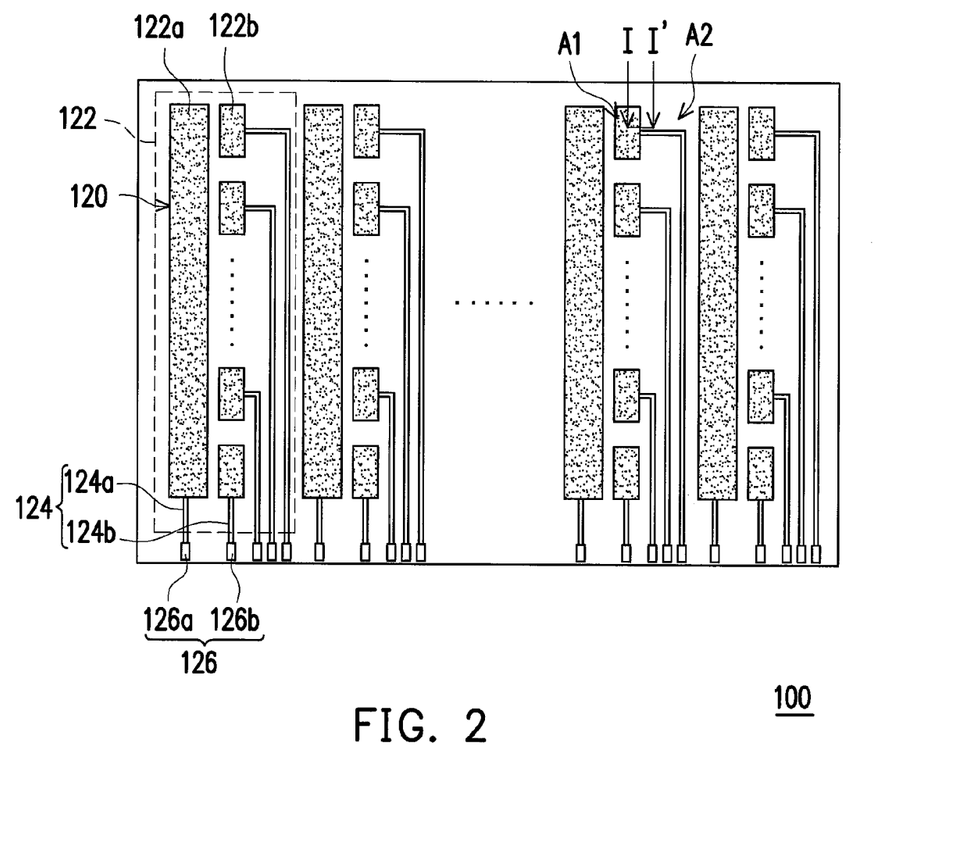
FIG. 2 is a schematic partial top view of a touch panel according to an embodiment of the invention.
Figure 3:
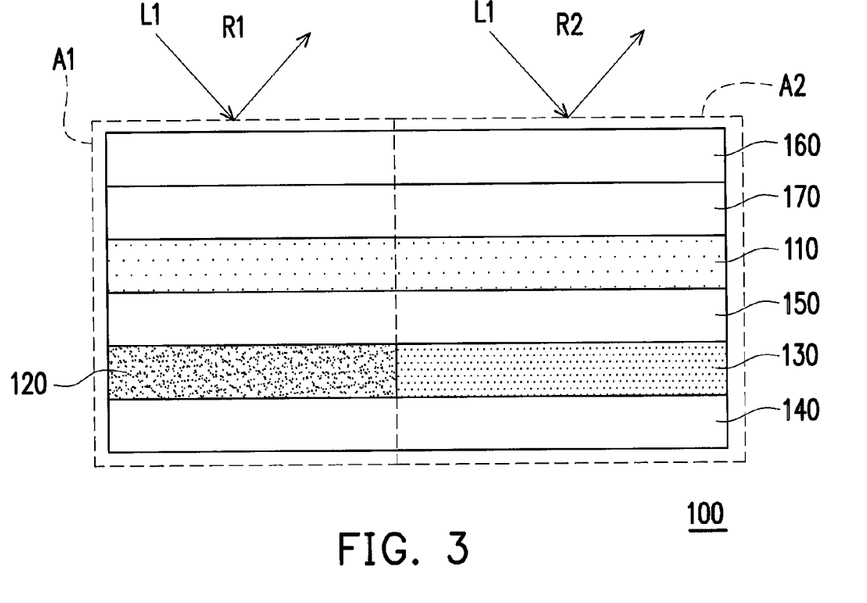
FIG. 3 is a schematic partial cross-sectional view taken along a line I-I' in FIG. 2.

FIG. 2 is a schematic partial top view of a touch panel according to an embodiment of the invention. FIG. 3 is a schematic partial cross-sectional view taken along a line I-I' in FIG. 2. With reference to FIG. 2 and FIG. 3, the touch panel 100 described in the present embodiment includes a first substrate 110, a touch sensing layer 120, a compensation pattern layer 130, a second substrate 140, and a first optical adhesive layer 150. The touch sensing layer 120 includes a plurality of electrode sets 122 arranged in parallel, and each of the electrode sets 122 includes a scan electrode 122a and a plurality of sensing electrodes 122b. The touch sensing layer 120 described herein is a one-film layer; that is, the scan electrode 122a and the sensing electrodes 122b in each electrode set 122 is located in the same film layer. Note that an orthogonal projection of the touch sensing layer 120 on the first substrate 110 is not overlapped with an orthogonal projection of the compensation pattern layer 130 on the first substrate 110, and patterns (or outline) of the touch sensing layer 120 and patterns (or outline) of the compensation pattern layer 130 are complementary. The compensation pattern layer 130 and the touch sensing layer 120 are located between the first substrate 110 and the second substrate 140, and the first optical adhesive layer 150 is also located between the first substrate 110 and the second substrate 140.

With reference to FIG. 2, the touch sensing layer 120 further includes a plurality of connection lines 124 and a plurality of connection pads 126. Parts of the connection lines 124a are connected between the scan electrodes 122a and parts of the connection pads 126a, and the other parts of the connection lines 124b are connected between the sensing electrodes 122b and the other parts of the connection pads 126b. Signals from the scan electrode 122a and the sensing electrodes 122b are electrically connected to the connection pads 126a and 126b through the connection lines 124a and 124b and are then electrically connected to other components through the connection pads 126a and 126b. When the touch panel 100 is operated, the scan electrodes 122a of different electrode sets 122 are sequentially scanned. While the scan electrode 122a of one of the electrode sets 122 is being scanned, the corresponding sensing electrodes 122b perform a sensing process, so as to achieve the touch function. In the present embodiment, the scan electrode 122a, the sensing electrodes 122b, the connection lines 124, and the connection pads 126 are formed in the same film layer, and thereby the single-layered design of the touch sensing layer 120 may be implemented.

The touch sensing layer 120 is constituted by the scan electrode 122a, the sensing electrodes 122b, the connection lines 124, and the connection pads 126 and thus has specific patterns (or outline). Therefore, it is likely to divide the touch panel 100 into two different regions A1 and A2. The touch sensing layer 120 is located in the region A1, and the region A2 does not have the touch sensing layer 120. According to the present embodiment, the compensation pattern layer 130 is located in the region A2, i.e., located outside the region A1 where the touch sensing layer 120 is located. That is, the orthogonal projection of the touch sensing layer 120 on the first substrate 110 is not overlapped with the orthogonal projection of the compensation pattern layer 130 on the first substrate 110. When light L1 passes through the different regions A1 and A2 of the touch panel 100, the reflectivities of light L1 may be different in respective regions A1 and A2 because of the different stacked film layers in these regions A1 and A2, and the difference in reflectivities of light L1 often leads to poor visibility. However, owing to the configuration of the compensation pattern layer 130, the issue of poor visibility can be resolved.

In particular, the region A1 where the touch sensing layer 120 is located has the reflectivity R1, and the region A2 where the compensation pattern layer 130 is located has the reflectivity R2. The greater the difference between the reflectivities R1 and R2 is, the easier the outlines of the regions A1 and A2 are observed. Hence, reduction of the difference between the reflectivities R1 and R2 is conducive to improvement of the visibility of the touch panel 100. In the present embodiment, the difference between the reflectivities R1 and R2 is less than 1%. Note that the reflectivity R1 and the reflectivity R2 respectively refer to the total reflectivity of each stacked layer in the region A1 where the touch sensing layer 120 is located and the total reflectivity of each stacked layer in the region A2 where the compensation pattern layer 130 is located. That is, when the light L irradiates the touch panel 100, the magnitude of reflection of the light L in the region A1 is the so-called reflectivity R1, and the magnitude of reflection of the light L in the region A2 is the so-called reflectivity R2. In the present embodiment, the thickness of the compensation pattern layer 130 and the thickness of the touch sensing layer 120 may be adjusted according to the difference between the reflectivities R1 and R2. Here, the touch sensing layer 120 is made of a transparent conductive material, e.g., indium tin oxide (ITO). The compensation pattern layer 130 is made of a transparent insulation material with a refractive index similar to that of ITO, e.g., $SiO_2$ or $Nb_2O_5$.

As shown in FIG. 3, the first optical adhesive layer 150 covers the touch sensing layer 120 and the compensation pattern layer 130 for bonding the first substrate 110 and the second substrate 140. In addition, the compensation pattern layer 130 and the touch sensing layer 120 are both located on the second substrate 140; namely, the compensation pattern layer 130 and the touch sensing layer 120 are both located between the first optical adhesive layer 150 and the second substrate 140. According to the present embodiment, the first substrate 110 and the second substrate 140 may be made of any material which can serve to carry a device with a plate-like structure, as known to those skilled in this field. For instance, the first substrate 110 may be a polarizer, and the second substrate 140 may be a color filter substrate. At this time, the touch sensing layer 120 is formed on the color filter substrate, so as to be applied in a display device. That is, the touch panel 100 may be an on-cell touch panel 100.

Besides, as depicted in FIG. 3, the touch panel 100 may selectively include a transparent cover 160 and a second optical adhesive layer 170. The first substrate 110 is located between the second substrate 140 and the transparent cover 160, and the second optical adhesive layer 170 is located between the first substrate 110 and the transparent cover 160. The transparent cover 160 is located at the outermost layer of the touch panel 100, so as to protect internal devices; the second optical adhesive layer 170 serves to bond the transparent cover 160 and the first substrate 110.

It should be mentioned that the types and the combination of the first and second substrates 110 and 140 are not limited to those described above; in another embodiment of the invention, the first substrate 110 of the touch panel 100 may be a transparent cover. At this time, the first substrate 110 may be exposed and need not be covered by the transparent cover 160 and the second optical adhesive layer 170; that is, a user is able to directly touch the first substrate 110. The second substrate 140 may be a color filter substrate; alternatively, the second substrate 140 may be a glass substrate or any other substrate made of a transparent material. If the second substrate 140 is a glass substrate, the touch sensing layer 120 may be formed in a one-glass-solution (OGS) manner. Here, the first optical adhesive layer 150 covers the touch sensing layer 120 and the compensation pattern layer 130 for bonding the first substrate 110 and the second substrate 140.

It should be mentioned that reference numbers and some descriptions provided in the previous exemplary embodiment are also applied in the following exemplary embodiment. The same reference numbers represent the same or similar components in these exemplary embodiments, and repetitive descriptions are omitted. The omitted descriptions may be referred to as those described in the previous exemplary embodiments and will not be provided hereinafter.

Figure 4:
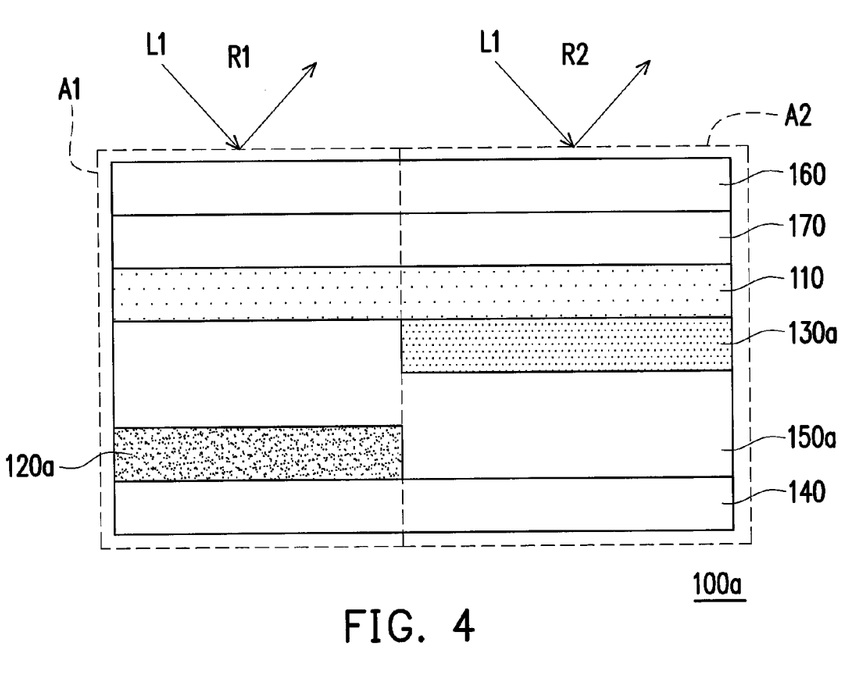
FIG. 4 is a schematic partial cross-sectional view of a touch panel according to another embodiment of the invention.

FIG. 4 is a schematic partial cross-sectional view of a touch panel according to another embodiment of the invention. With reference to FIG. 4, the touch panel 100a described in the present embodiment is substantially similar to the touch panel 100 illustrated in FIG. 2, while one of the differences therebetween lies in that the compensation pattern layer 130 and the touch sensing layer 120 are both located on the second substrate 140 in the embodiment shown in FIG. 2; in the present embodiment, however, the compensation pattern layer 130a is located on the first substrate 110, and the touch sensing layer 120a is located on the second substrate 140. In the present embodiment, the first substrate 110 is a polarizer, and the second substrate 140 can be a color filter substrate. During the manufacturing process, the touch sensing layer 120a is formed on the color filter substrate, and the compensation pattern layer 130a is formed on the polarizer. The touch sensing layer 120a and the compensation pattern layer 130a are then bonded to each other through the first optical adhesive layer 150a.

Figure 5:
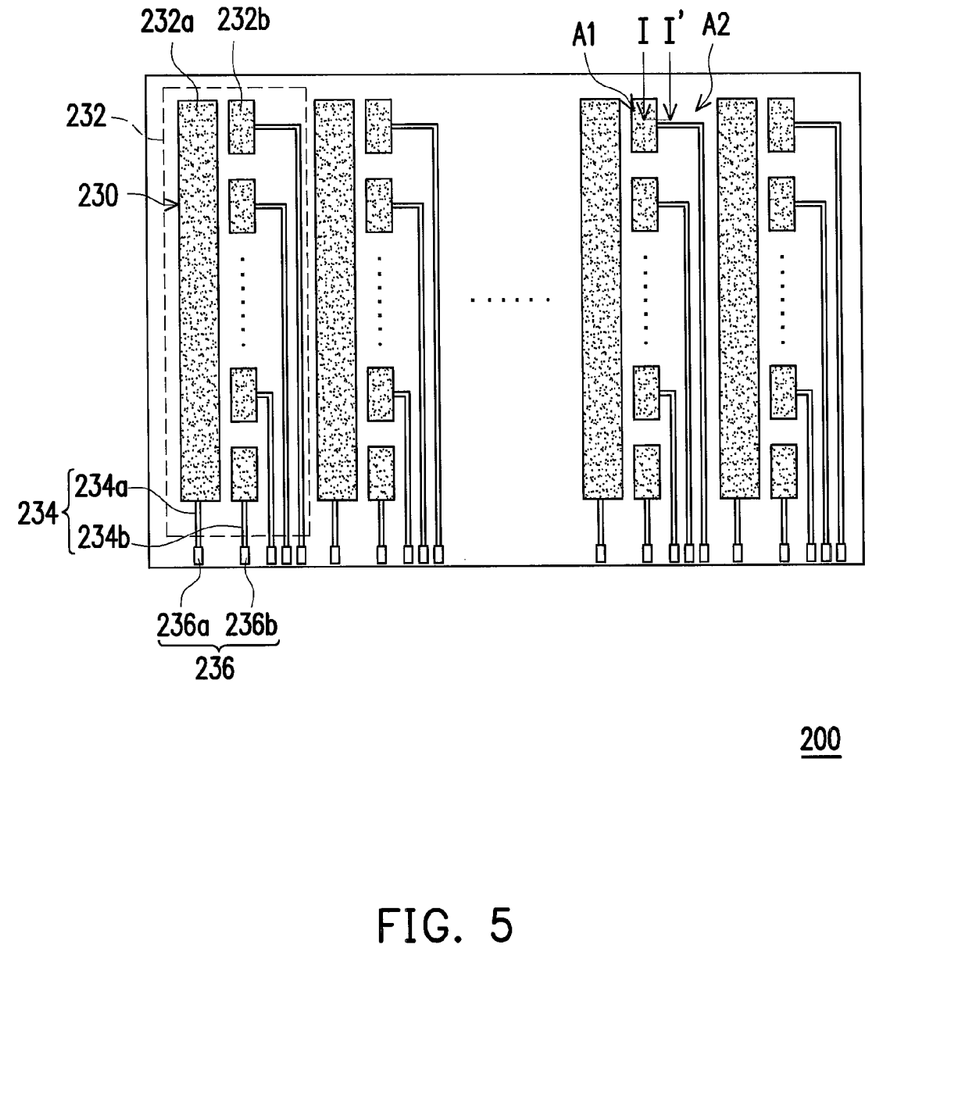
FIG. 5 is a schematic partial top view of a touch display according to an embodiment of the invention.
Figure 6:
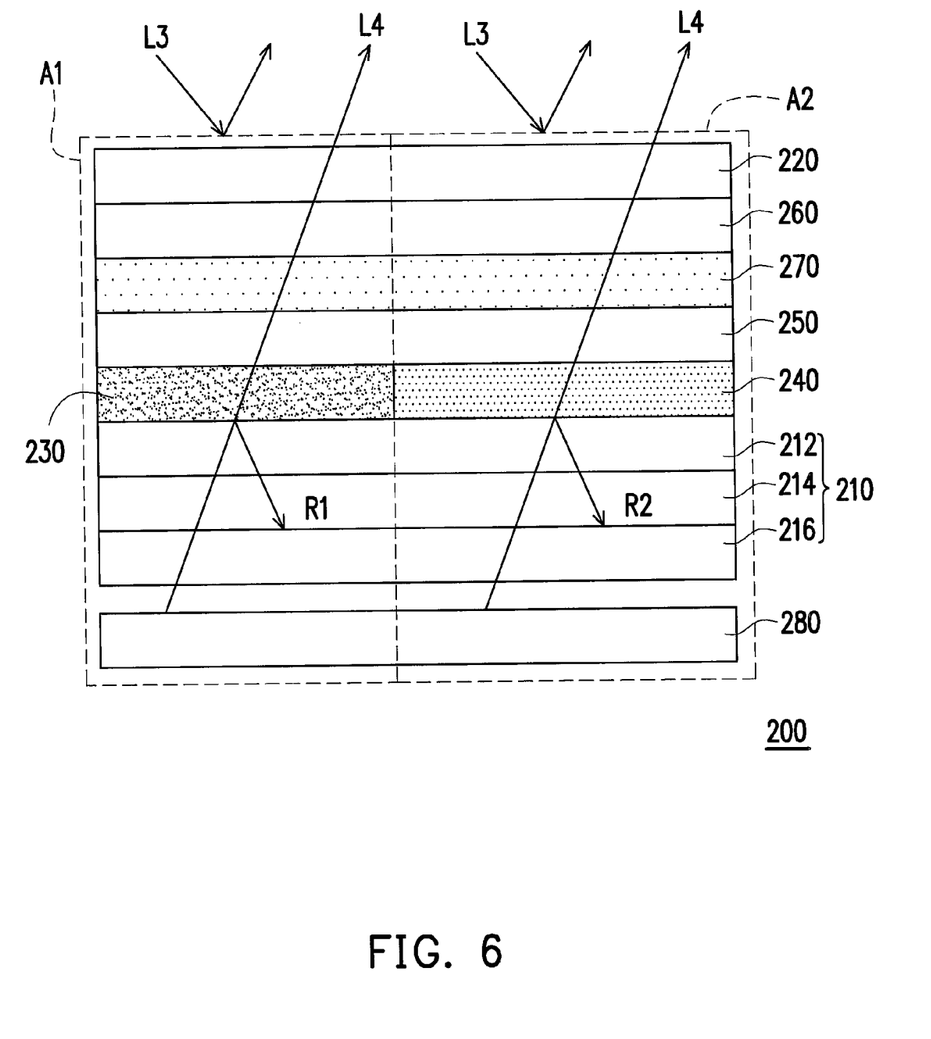
FIG. 6 is a schematic partial cross-sectional view taken along a line I-I' in FIG. 5.

FIG. 5 is a schematic partial top view of a touch display according to an embodiment of the invention. FIG. 6 is a schematic partial cross-sectional view taken along a line I-I' in FIG. 5. With reference to FIG. 5 and FIG. 6, the touch panel 200 described in the present embodiment includes a display panel 210, a first substrate 220, a touch sensing layer 230, a compensation pattern layer 240, and a first optical adhesive layer 250. The first substrate 220 is located above the display panel 210. The touch sensing layer 230 includes a plurality of electrode sets 232 arranged in parallel, and each of the electrode sets 232 includes a scan electrode 232a and a plurality of sensing electrodes 232b. The touch sensing layer 230 described herein is a one-film layer; that is, the scan electrode 232a and the sensing electrodes 232b in each electrode set 232 is located in the same film layer. Note that an orthogonal projection of the touch sensing layer 230 on the first substrate 220 is not overlapped with an orthogonal projection of the compensation pattern layer 240 on the first substrate 220, and patterns (or outline) of the touch sensing layer 230 and patterns (or outline) of the compensation pattern layer 240 are complementary. The compensation pattern layer 240 and the touch sensing layer 230 are both located between the first substrate 220 and the display panel 210, and the first optical adhesive layer 250 is also located between the first substrate 220 and the display panel 210.

With reference to FIG. 5, the touch sensing layer 230 further includes a plurality of connection lines 234 and a plurality of connection pads 236. Parts of the connection lines 234a are connected between the scan electrodes 232a and parts of the connection pads 236a, and the other parts of the connection lines 234b are connected between the sensing electrodes 232b and the other parts of the connection pads 236b. Signals from the scan electrodes 232a and the sensing electrodes 232b are electrically connected to the connection pads 236a and 236b through the connection lines 234a and 234b and are then electrically connected to other components through the connection pads 236a and 236b. When the touch panel 200 is operated, the scan electrodes 232a of different electrode sets 232 are sequentially scanned. While the scan electrode 232a of one of the electrode sets 232 is being scanned, the corresponding sensing electrodes 232b perform a sensing process, so as to achieve the touch function. In the present embodiment, the scan electrode 232a, the sensing electrodes 232b, the connection lines 234, and the connection pads 236 are formed in the same film layer, and thereby the single-layered design of the touch sensing layer 230 may be implemented.

The touch sensing layer 230 is constituted by the scan electrode 232a, the sensing electrodes 232b, the connection lines 234, and the connection pads 236 and thus has specific patterns (or outline). Therefore, it is likely to divide the touch panel 200 into two different regions A1 and A2. The touch sensing layer 230 is located in the region A1, and the region A2 does not have the touch sensing layer 230. That is, the orthogonal projection of the touch sensing layer 230 on the first substrate 220 is not overlapped with the orthogonal projection of the compensation pattern layer 240 on the first substrate 220, i.e., the region A2 where the compensation pattern layer 240 is located is beyond the region A1 where the touch sensing layer 230 is located. When light L3 passes through the different regions A1 and A2 of the touch panel 200, the reflectivities of light may be different in respective regions A1 and A2 because of the different stacked film layers in these regions A1 and A2, and the difference in reflectivities of light often leads to poor visibility. However, in the present embodiment, the issue of poor visibility can be resolved.

In particular, the region A1 where the touch sensing layer 230 is located has the reflectivity R1, and the region A2 where the compensation pattern layer 240 is located has the reflectivity R2. The reduction of the difference between the reflectivities R1 and R2 is conducive to improvement of the visibility of the touch panel 200. In the present embodiment, the difference between the reflectivity R1 and the reflectivity R2 is less than 1%. Note that the reflectivity R1 and the reflectivity R2 respectively refer to the total reflectivity of each stacked layer in the region A1 where the touch sensing layer 230 is located and the total reflectivity of each stacked layer in the region A2 where the compensation pattern layer 240 is located. That is, when the light L3 irradiates the touch panel 200, the magnitude of reflection of the light L3 in the region A1 is the so-called reflectivity R1, and the magnitude of reflection of the light L3 in the region A2 is the so-called reflectivity R2. In the present embodiment, the thickness of the compensation pattern layer 240 and the thickness of the touch sensing layer 230 may be adjusted according to the difference between the reflectivity R1 and the reflectivity R2. Here, the touch sensing layer 230 is made of a transparent conductive material, e.g., ITO. The compensation pattern layer 240 is made of a transparent insulation material with a refractive index similar to that of ITO, e.g., $SiO_2$ or $Nb_2O_5$.

As shown in FIG. 6, the display panel 210 of the touch display 200 includes a color filter substrate 212, an active device array substrate 216, and a display medium 214. The display medium 214 is located between the color filter substrate 212 and the active device array substrate 216, and the color filter substrate 212 is located between the first substrate 220 and the active device array substrate 216. In addition, the touch display 200 further includes a backlight module 280 that is located below the display panel 210, and the backlight module 280 provides light required by the display medium 214. When light L4 provided by the backlight module 280 passes through the different regions A1 and A2 of the touch panel 200, the reflectivities R1 and R2 of light L4 may be different in respective regions A1 and A2 because of the different stacked film layers in these regions A1 and A2, and the difference in reflectivities of light L4 often leads to poor visibility. However, owing to the configuration of the compensation pattern layer 240, the issue of poor visibility can be resolved. In another embodiment which is not shown, the display medium is a self-illuminating display medium, and the display panel is, for instance, an organic electroluminescent display panel. In this case, the touch display does not require any backlight module; besides, through the compensation pattern layer, the light provided by the self-illuminating display medium does not encounter the issue of optical interference.

With reference to FIG. 6, the compensation pattern layer 240 and the touch sensing layer 230 are located between the display panel 210 and the first optical adhesive layer 250. Specifically, the compensation pattern layer 240 and the touch sensing layer 230 are both located between the first substrate 220 and the color filter substrate 212, and the first optical adhesive layer 250 covers the touch sensing layer 230 and the compensation pattern layer 240. That is, the touch sensing layer 230 is formed on the color filter substrate 212, and the display panel 210 is an on-cell touch display panel. As depicted in FIG. 5, the touch display 200 further includes a second substrate 270, e.g., a polarizer, and the second substrate 270 is located between the color filter substrate 212 and the first substrate 220. Both the touch sensing layer 230 and the compensation pattern layer 240 are located between the first substrate 220 and the second substrate 270. In addition, the touch display 200 described in the present embodiment further includes a second optical adhesive layer 260, and the first substrate 220 is a transparent cover. The transparent cover 270 is located at the outermost layer of the touch panel 200, so as to protect internal devices; the second optical adhesive layer 260 serves to bond the transparent cover and the second substrate 270.

It should be mentioned that reference numbers and some descriptions provided in the previous exemplary embodiment are also applied in the following exemplary embodiment. The same reference numbers represent the same or similar components in these exemplary embodiments, and repetitive descriptions are omitted. The omitted descriptions may be referred to as those described in the previous exemplary embodiments and will not be provided hereinafter.

Figure 7:
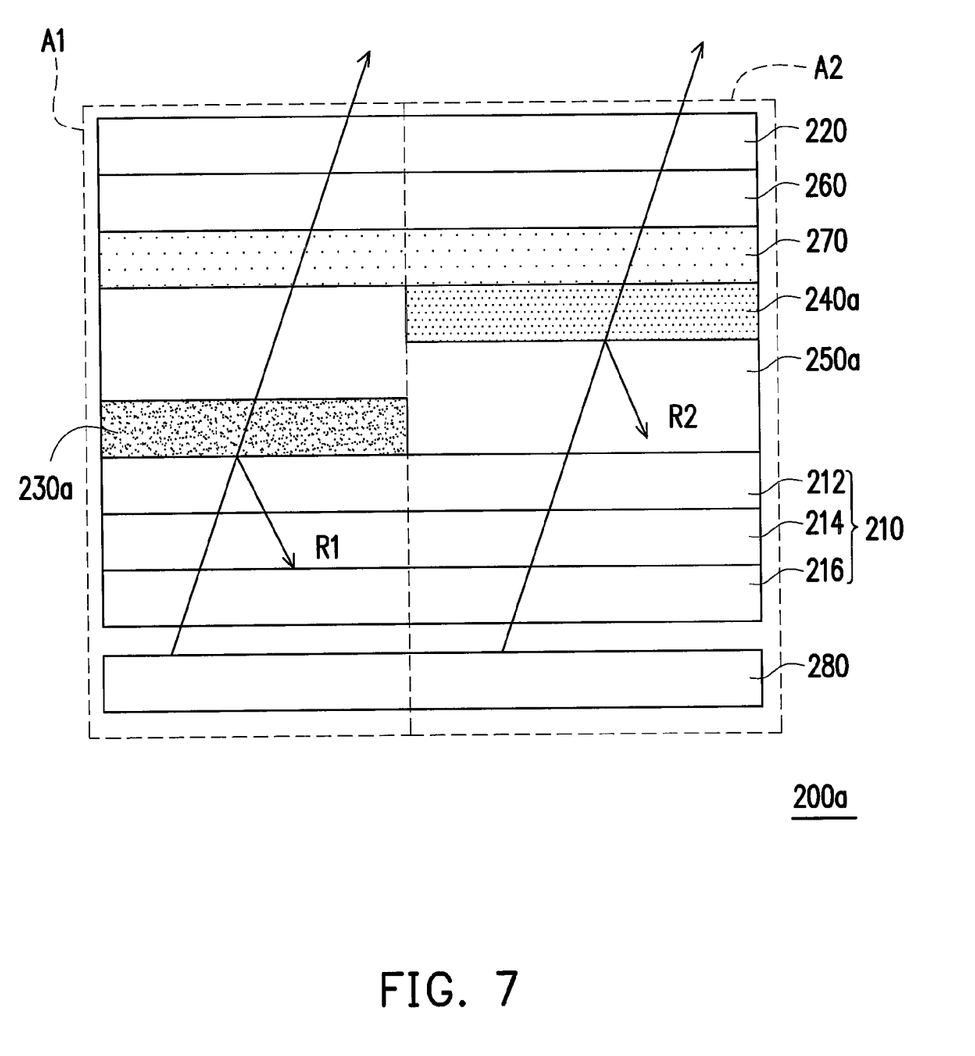
FIG. 7 is a schematic partial cross-sectional view of a touch display according to another embodiment of the invention.

FIG. 7 is a schematic partial cross-sectional view of a touch display according to another embodiment of the invention. The touch display 200a described in the present embodiment is substantially similar to the touch display 200 illustrated in FIG. 5, while one of the differences therebetween lies in that the compensation pattern layer 240 and the touch sensing layer 230 are located between the display panel 210 and the first optical adhesive layer 250 in the embodiment shown in FIG. 5; in the present embodiment, however, the compensation pattern layer 240a and the touch sensing layer 230a are located at two respective sides of the first optical adhesive layer 250a. In the present embodiment, the second substrate 270 is a polarizer. During the manufacturing process, the touch sensing layer 230a is formed on the color filter substrate 212, and the compensation pattern layer 240a is formed on the polarizer. The touch sensing layer 230a and the compensation pattern layer 240a are then bonded to each other through the first optical adhesive layer 250a.

Figure 8:
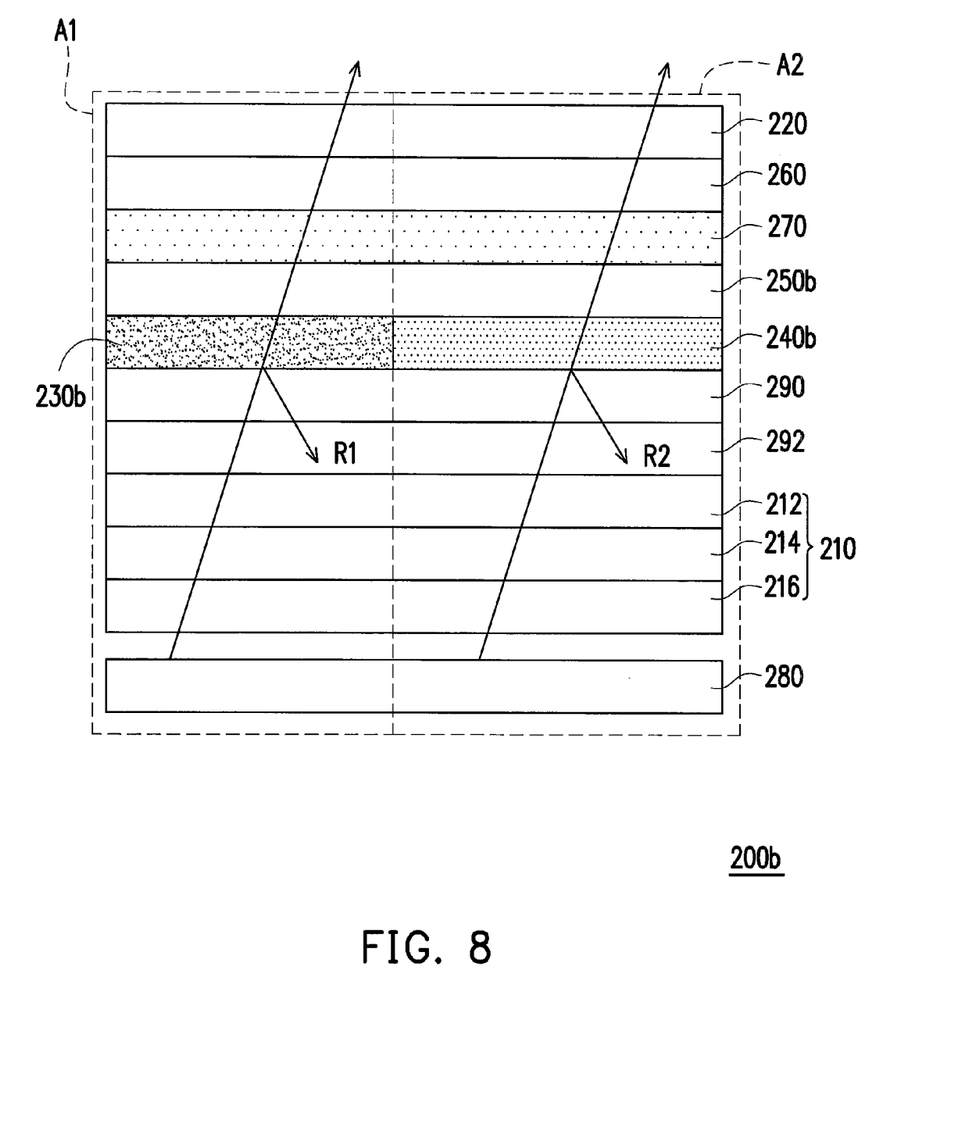
FIG. 8 is a schematic partial cross-sectional view of a touch display according to another embodiment of the invention.

FIG. 8 is a schematic partial cross-sectional view of a touch display according to another embodiment of the invention. The touch display 200b described in the present embodiment is substantially similar to those illustrated in FIG. 5 and FIG. 7, while one of the differences therebetween lies in that the touch sensing layer shown in FIG. 5 and FIG. 7 is formed on the color filter substrate; in the present embodiment, however, the touch sensing layer 230b is formed on a third substrate 290. The third substrate 290 may be a glass substrate, i.e., the touch sensing layer 230b may be formed in an OGS manner. Besides, the third optical adhesive layer 292 is utilized to bond the third substrate 290 and the display panel 210. Note that the touch display 200b exemplarily includes the backlight module 280 in the present embodiment, which should however not be construed as a limitation to the invention. For instance, if the touch display medium 214 is a self-illuminating display medium, the touch display 200b does not require the backlight module 280. From another perspective, note that the compensation pattern layer 240b and the touch sensing layer 230b are exemplarily located between the display panel 210 and the first optical adhesive layer 250b in the present embodiment, which should however not be construed as a limitation to the invention. The arrangement of the compensation pattern layer 240b and the touch sensing layer 230b may refer to that depicted in FIG. 7, i.e., the compensation pattern layer 240b and the touch sensing layer 230b are located at two respective sides of the first optical adhesive layer 250b.

To sum up, the touch panel and the touch display described herein individually include the compensation pattern layer by which the touch panel and the touch display may be individually divided into two regions. One of these two regions has the touch sensing layer, and the other region has the compensation pattern layer. Since the orthogonal projection of the touch sensing layer on the first substrate is not overlapped with the orthogonal projection of the compensation pattern layer on the first substrate, the region where the compensation pattern layer is located is beyond the region where the touch sensing layer is located. When light passes through the different regions of the touch panel or the touch display, the reflectivities of light may be different in the two regions because of the different stacked film layers in these regions, and the difference in reflectivities of light often leads to poor visibility. However, in an embodiment of the invention, the issue of poor visibility can be resolved. Moreover, when light passes through different regions of the touch display, the difference in the refractive indexes of the stacked film layers in each region may bring about optical interference. In an embodiment of the invention, however, the issue of the optical interference may be resolved because the light emitted from the touch display (e.g., from a backlight module or a self-illuminating display medium) passes through the compensation pattern layer. In conclusion, the touch panel and the touch display described herein are characterized by great visibility.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A touch panel comprising:
   a first substrate;
   a touch sensing layer comprising a plurality of electrode sets arranged in parallel, wherein each of the electrode sets comprises a scan electrode and a plurality of sensing electrodes;
   a compensation pattern layer, wherein an orthogonal projection of the touch sensing layer on the first substrate is not overlapped with an orthogonal projection of the compensation pattern layer on the first substrate, and wherein the compensation layer is formed directly on the first substrate;
   a second substrate, wherein the compensation pattern layer and the touch sensing layer are located between the first substrate and the second substrate, wherein the touch sensing layer is formed directly on a second substrate;
   a first optical adhesive layer, located between the first substrate and the second substrate, bonding the compensation layer and the touch sensing layer together such that the first optical adhesive is attached directly to the first substrate, the second substrate, the compensation pattern layer, and the touch sensing layer; and
   wherein a region where the touch sensing layer is located has a reflectivity R1, a region where the compensation pattern layer is located has a reflectivity R2, and a difference between R1 and R2 is less than 1%.

2. The touch panel as recited in claim 1, wherein the touch sensing layer further comprises a plurality of connection lines and a plurality of connection pads, parts of the connection lines are connected between the scan electrodes and parts of the connection pads, and the other parts of the connection lines are connected between the sensing electrodes and the other parts of the connection pads.

3. A touch display comprising:
   a display panel comprising of a color filter substrate;
   a first substrate located above the display panel;
   a touch sensing layer comprising a plurality of electrode sets arranged in parallel, wherein each of the electrode sets comprises a scan electrode and a plurality of sensing electrodes, and wherein the touch sensing layer is formed directly on the color filter substrate;
   a compensation pattern layer, wherein an orthogonal projection of the touch sensing layer on the first substrate is not overlapped with an orthogonal projection of the compensation pattern layer on the first substrate, wherein the compensation layer is formed directly on the first substrate, and wherein the touch sensing layer and the compensation pattern layer are both located between the first substrate and the display panel; and
   a first optical adhesive layer, located between the first substrate and the display panel, bonding the compensation layer and the touch sensing layer together such that the first optical adhesive is attached directly to the first substrate, the color filter substrate, the compensation pattern layer, and the touch sensing layer; and
   wherein a region where the touch sensing layer is located has a reflectivity R1, a region where the compensation pattern layer is located has a reflectivity R2, and an absolute value of a difference between R1 and R2 is less than 1%.

4. The touch display as recited in claim 3, wherein the touch sensing layer further comprises a plurality of connection lines and a plurality of connection pads, parts of the connection lines are connected between the scan electrodes and parts of the connection pads, and the other parts of the connection lines are connected between the sensing electrodes and the other parts of the connection pads.

* * * * *